United States Patent Office 3,830,806
Patented Aug. 20, 1974

3,830,806
DERIVATIVES OF 1-PHENOXY-3-AMINO-PROPAN-2-OL
Thomas Raabe, Heusenstamm, Rolf-Eberhard Nitz, Bergen-Enkheim and Josef Scholtholt, Frankfurt am Main-Fechenheim, Germany, assignors to Cassella Farbwerke Mainkur Aktiengesellschaft, Frankfurt (Main)-Fechenheim, Germany
No Drawing. Filed July 28, 1972, Ser. No. 276,029
Claims priority, application Switzerland, Aug. 3, 1971, 11415/71
Int. Cl. C07d 31/28
U.S. Cl. 260—240 J      11 Claims

ABSTRACT OF THE DISCLOSURE

The present invention relates to new pharmacologically valuable derivatives of 1-phenoxy-3-amino-propan-2-ol having the formula

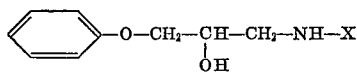

and the aldehyde condensation products and acid addition salts thereof wherein X is selected from the group consisting of

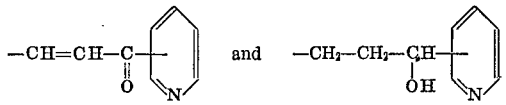

wherein the phenyl ring may have attached to it up to three similar or different substituents selected from the group consisting of alkyl, alkenyl, alkinyl, cycloalkyl, cycloalkenyl, alkoxy, alkenyloxy, alkinyloxy, phenyl, halogen and —$NR_1R_2$, wherein $R_1$ is selected from alkyl and acyl, and $R_2$ is selected from hydrogen and alkyl; and to the production thereof by a method selected from (A) reacting 1-phenoxy-3-amino-propan-2-ol having the formula

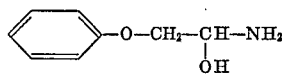

with a compound having the formula Y—X, wherein X has the above-defined meaning and Y is selected from halogen, —OH, —OK or —ONa; (B) reacting a compound of the formula

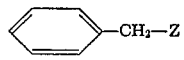

with a compound of the formula $H_2N$—X, wherein X has the above-defined meaning and Z is selected from

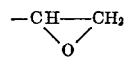

and

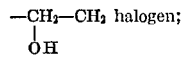

(C) reacting a phenol

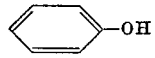

with Z—$CH_2$—NH—X, wherein X and Z have the meaning defined above.

———

The invention relates to new pharmacologically valuable derivatives of 1-phenoxy-3-amino-propan-2-ol of the general formula I

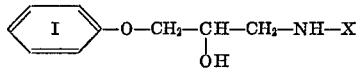

together with their aldehyde condensation products and acid addition salts wherein X is

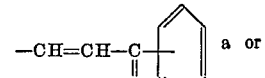

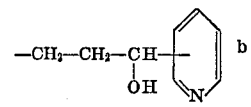

and the phenyl ring I may have up to three similar or different substituents selected from alkyl, alkenyl, alkinyl, cycloalkyl, cycloalkenyl, alkoxy, alkenyloxy, alkinyloxy, phenyl, halogen or the radical —$NR_1R_2$, $R_1$ standing for alkyl or acyl $R_2$ standing for hydrogen or alkyl.

Compounds according to the invention in which X signifies

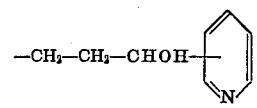

are preferred.

The pyridyl radicals in the compounds according to the invention can be 2-, 3- or 4-pyridyl radicals.

Within the framework of the present invention, the compounds of the general formula I are also understood to include possible stereo-isomers and optically active compounds and mixtures thereof, especially the racemates.

The substituents of the phenyl ring I possess in particular the following meanings:

Alkyl with 1 to 4 carbon atoms, e.g. methyl, ethyl, propyl, tert.-butyl;
Alkenyl with up to 6 carbon atoms, preferably vinyl, allyl, methallyl, crotyl;
Alkinyl with up to 6 carbon atoms, e.g. propargyl;
Cycloalkyl with a ring size of from 5 to 8 carbon atoms, preferably cyclopentyl and cyclohexyl;
Cycloalkenyl with a ring size of from 5 to 8 carbon atoms, preferably cyclopentenyl;
Alkoxy, alkenyloxy and alkinyloxy in each case with up to 5 carbon atoms, preferably methoxy, ethoxy, propoxy, butoxy, allyloxy, methallyloxy, propargyloxy;
Halogen, preferably bromine or chlorine.

Alkyl radicals for $R_1$ or $R_2$ preferably possess from 1 to 2 carbon atoms.

The acyl radical for $R_1$ is understood to include the aryl-substituted or alkyl-substituted carbonyl radical with up to 11 carbon atoms derived from an aromatic or aliphatic carboxylic acid, e.g. formyl, acetyl, propionyl, butyryl, benzoyl, naphthoyl, phenyl acetyl, but preferably acetyl or benzoyl.

The aldehyde condensation products of the compounds of the general formula I are oxazolidines of the formula Ic

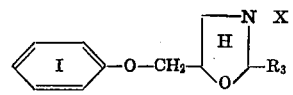

which are formed during the condensation of compounds of the general formula I with an aldehyde of the formula:

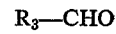

in which $R_3$ signifies hydrogen or a lower alkyl radical with up to 4 carbon atoms.

Inorganic and organic acids are suitable for forming salts with the compounds of the general formula I. Suitable acids, for example, are hydrochloric acid, hydrobromic acid, phosphoric, sulphuric, oxalic, lactic, tartaric, acetic, salicylic, benzoic, citric or adipic acids. Pharmaceutically acceptable acid addition salts are preferred.

Compounds of the general formula I can be produced, for example, by the processes described below, in which the phenyl rings I of the following formulae diagrams can be substituted as stated above in the case of the general formula I.

PROCESS A

A 1-phenoxy-3-amino-propan-2-ol of the general formula II is reacted with a compound of the general formula III to form a compound according to the invention I:

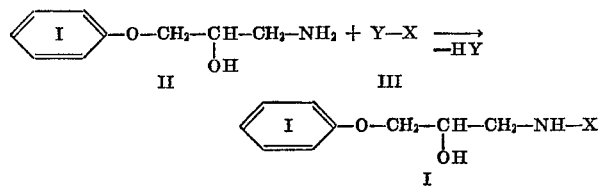

In this, X has the meaning already given and Y signifies halogen, especially chlorine or bromine, and if X signifies

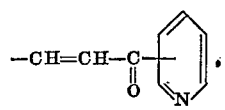

it may also signify —OH, —OK or —ONa.

PROCESS B

A compound of the general formula IV is reacted with a compound of the general formula V to give a compound according to the invention I:

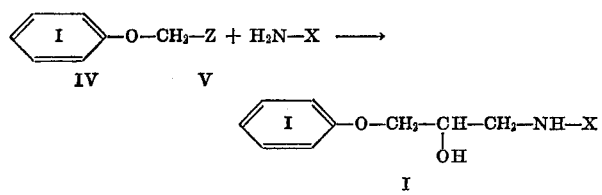

In this, X has the meaning already given above and Z signifies:

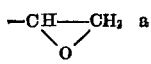

or

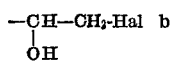

Hal signifies a halogen atom, especially chlorine or promine.

PROCESS C

Compounds of the general formula I according to the invention can also be synthesised by reacting a compound of the general formula VI with a phenol of the general formula VII.

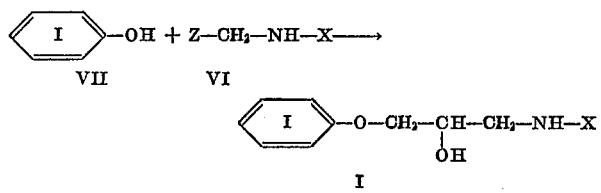

Z and X have the meanings already given above.

Process D

The preferred compounds Ib according to the invention

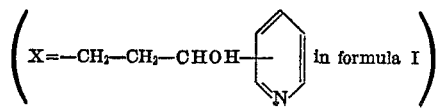

can also be produced by the hydrogenation of the compounds Ia according to the invention, and also of compounds of the general formulae VIII, IX or X;

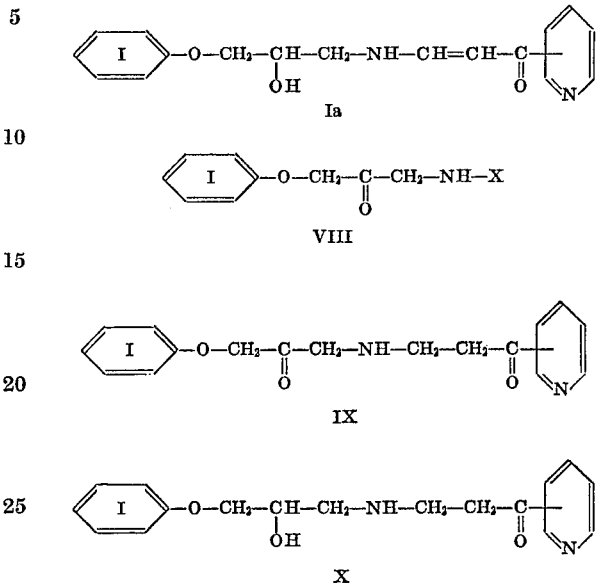

The individual processes and the production of the initial products required for carrying them out are described in greater detail below:

The reaction according to Process A is normally carried out in a suitable solvent or dispersant in which the reactants are dissolved or suspended. Such solvents or dispersants are, for example, benzene, toluene, acetone, dioxane. As solvents one uses in partcular polar solvents such as, for example, alcohols. The reaction frequently already takes place at normal temperature. If X signifies

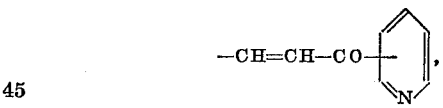

the reaction is accelerated by the addition of an acid, preferably hydrochloric acid.

When Y=OH, catalytic quantities of the acid, are already sufficient, for example of acetic or formic acid. If Y=ONa or OK, then about 1 mole of the acid is added. Instead of this, it is also possible to use the compound of the general formula II in the form of a salt, for example of the hydrohalide. If Y signifies halogen, then the compound of the general formula III can also be used in the form of the hydrohalide. In the Process A, the acid addition salts of the compounds I may result.

The pyridiyl propenone compounds of the general formula IIIa which are required as the initial compounds

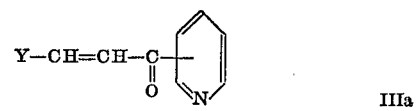

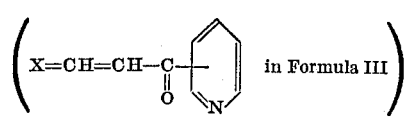

can be obtained by reacting the 2-, 3- or 4-acetyl-pyridine with a formate ester, especially methyl formate or ethyl formate, under the conditions of an alkaline ester condensation. From the sodium or potassium salts of the vinylogous, 2-, 3- or 4-pyridinecarboxylic acids which can be produced in this way, it is possible by hydrolysis to produce the vinylogous pyridinecarboxylic acid (Y=OH in formulate IIIa), which in turn can be converted with suitable halogenating agents, such as thionyl chlorides or phosphorus tribromide, into the corresponding vinylogous pyridinecarboxylic acid halides of the general formula IIIb (Hal-halogen, especially Cl or Br).

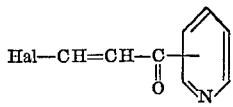

IIIb

Compounds of the general formula III, in which Y=halogen (Hal), especially bromine or chlorine, and X=

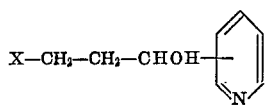

and to which the general formula IIIc applies:

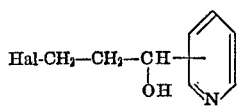

IIIc can be produced from the corresponding compounds IIIb by hydrogenation, advantageously with complex hydrides, such as lithium aluminium hydride, sodium boron hydride or the like.

The compounds of the general formula II required as initial compounds can be produced by reacting a compound of the general formula IVa or IVb:

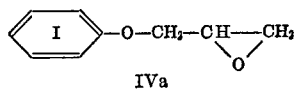

IVa

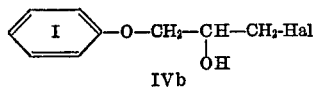

IVb in which in IVb Hal signifies a halogen atom, especially chlorine or bromine, or a mixture of a compound IVa with a compound IVb similarly substituted in the phenyl ring I, with ammonia or compounds which split off ammonia. The reaction can be carried out under atmospheric pressure or under elevated pressure at ambient temperature and can be accelerated or brought to termination by the supply of heat, for example by heating to 70° C.

The compounds of the general formulae IVa and IVb can be produced by reacting a phenol of the general formula VII:

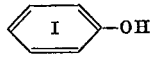

VII with an epihalogenhydrin, advantageously with epichlorohydrin or epibromohydrin. According to the particular reaction conditions, when this is done one obtains a compound of the general formula IVa or IVb or a mixture of compounds of the general formulae IVa and IVb. The resultant reaction product can be isolated for its further reaction with ammonia, but it can also be further reacted direct without isolation.

When carrying out the process B, it is also possible to use a mixture of two compounds IVa and IVb which are similarly substituted in the phenyl ring I. Thus one obtains direct by the reaction of 3-amino-1-(pyridyl)-propan-1-ols of the formula Vb with compounds of the general formulae IVa or IVb compounds according to the invention of the general formula Ib:

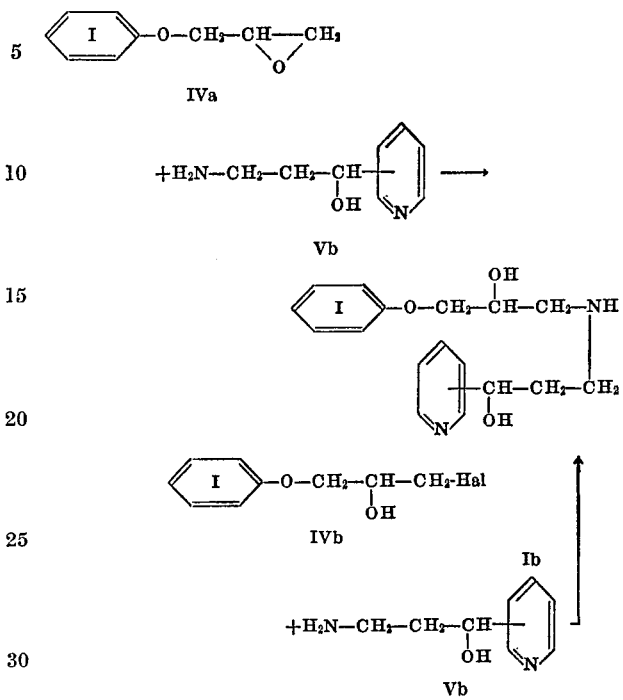

The reactions according to the process B are carried out in a suitable solvent at normal or elevated temperature. Suitable solvents are, for example, benzene, toluene, acetone, dioxane, alcohols. The reaction of compounds of the general formula IVb can be carried out in the presence of acid-binding agents, such as potash, soda etc. or without acid-binding agents, when in the latter case one usually obtains the hydrohalides of Ib.

In the process C one can also use instead of a uniform compound of the general formula VI a mixture, for example of VIa and VIb:

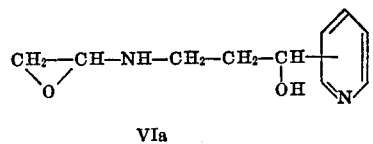

VIa

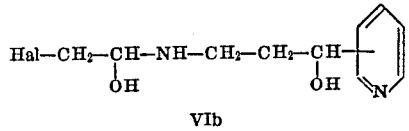

VIb in each case with the same pyridyl radical. The reactions according to Process C can be carried out either in an aqueous alkaline solution, for example in dilute caustic soda, or in suitable solvents, such as benzene, toluene, dioxane, but preferably in absolute acetone in the presence of potash or soda. The reaction can be carried out at normal temperature or can be accelerated or brought to termination by heating.

According to the process D it is possible to produce from the compounds Ia according to the invention:

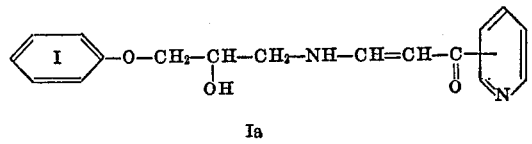

Ia by hydrogenation compounds according to the invention Ib:

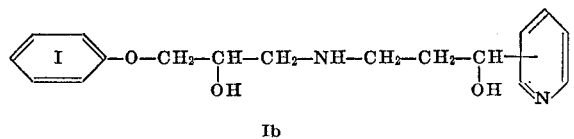

Ib

For hydrogenation one advantageously uses complex hydrides, such as lithium aluminium hydride, sodium boron hydride and the like. The reaction is carried out under the reaction conditions known for these hydrides, normally in an alcohol/water mixture at room temperature or elevated temperature, for example boiling under a reflux. The hydrogenation can also be carried out catalytically, for example using a palladium/carbon catalyst.

Analogously it is possible for compounds of the general formulae VIII, IX and X to be hydrogenated. Initial compounds of the formula VIII can be obtained by reacting a compound of the general formula XI with a compound of the general formula IIIb or IIIc.

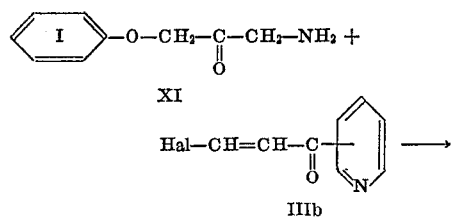

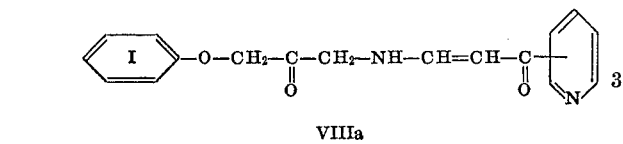

VIIIa

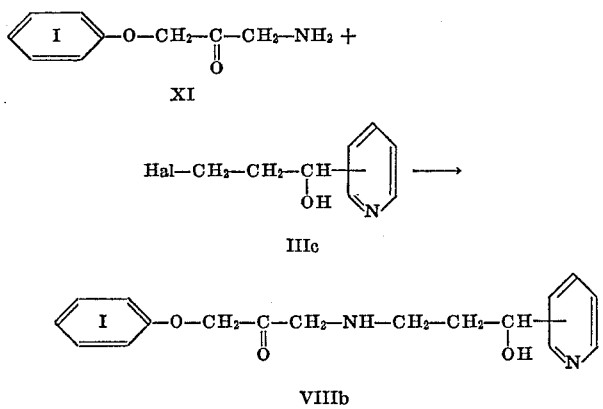

VIIIb

When written in general terms, the equation of the reaction reads as follows:

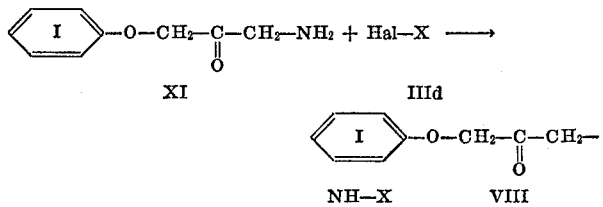

in which in the general formula IIId Hal signifies halogen, preferably chlorine. The reactions between the compounds of the general formula XI and IIIc or IIIb are carried out in solvents, such as benzene, toluene, chloroform, methylene chloride, dioxane etc. at normal or elevated temperature in the presence of at least molar quantities of acid-binding agents, such as potash or soda, or in the absence of acid-binding agents, when in the latter case one usually obtains the hydrohalides of the compounds VIII.

For the production of compounds of the general formula XI one reacts, for example, a phenol of the general formula VII with a halogen acetone of the general formula XII, for example bromoacetone, one brominates or chlorinates the resultant product of the general formula XIII, as a result of which one obtains a compound of the general formula XIV, which is converted with ammonia or compounds which split off ammonia into a compound of the general formula XI.

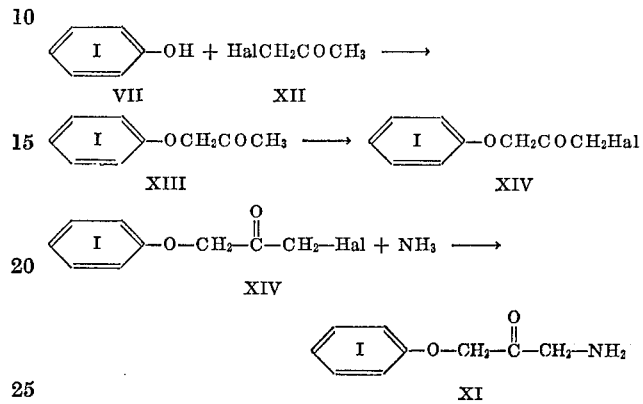

Initial compounds of the general formula IX can be produced by a Mannich Reaction from a compound of the general formula XI, formaldehyde and 2-, 3- or 4-acetylpyridine.

Compounds of the general formula X can be synthesized by a Mannich Reaction from a compound of the general formula II, formaldehyde XV and a 2-, 3- or 4-acetylpyridine of the general formula XVI:

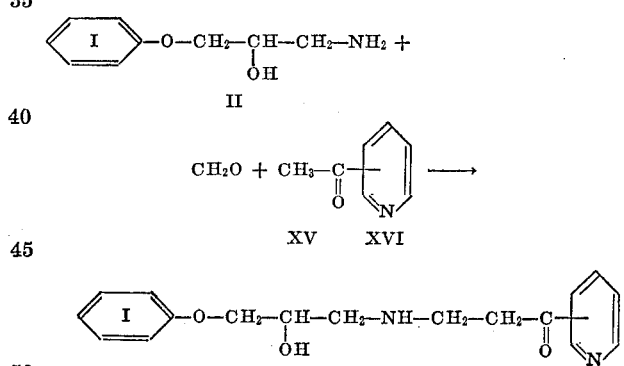

Aldehyde condensation products of the formula Ic of the compounds according to the invention are obtained if one reacts compounds of the general formula I with an aldehyde of the formula $R_3$—CHO, in which $R_3$ signifies hydrogen or a lower alkyl radical, in a diluent or solvent, for example ethyl alcohol, preferably in the presence of an acid catalyst, for example acetic acid or hydrochloric acid and preferably at elevated temperature. The water formed during the reaction can be removed by means of an entraining agent, for example benzene, by azetropic distillation or by means of a dehydrating agent such as anhydrous potassium carbonate.

The acid addition salts of the compounds of the general formula I can be produced in a known manner from the components. When this is done it is generally advantageous to use a diluent, and in the case of an excess of acid one generally obtains the di-salts of the compounds of the general formula I. The mono-acid-addition salts are obtained either by the deliberate addition of only 1 mole of acid or by the partial hydrolysis of the di-acid-addition salts.

From the racemates there may be obtained in the manner known *per se* the compounds optically active by racemate-cleavage with the aid of optically active acids.

Suitable optically-active acids are, for example:

+ Mandelic acid
− Tartaric acid
+ Dibenzoyl-tartaric acid
− Di-p-toluyl-tartaric acid
1 Campharic acid When reacting the racemate with an optically active acid, salts are formed which differ both with regard to their optical and their physical properties, e.g., with respect to their solubilities and melting points and by this they may be separated by fractional crystallisation. From the salts thus separated the optically active compounds of the general formula I may be set free with the aid of bases, such as potassium or sodium hydroxide.

The compounds according to the invention of the general formula I, their aldehyde condensation products Ic and their pharmaceutically acceptable acid addition salts possess valuable pharmaceutical properties. The compounds of the general formula Ia exert actions on the central nervous system and possess anorectic properties. As already mentioned, they are further valuable intermediates for the manufacture of compounds of the general formula Ib. The compounds of the general formula Ib are suitable for the treatment or prophylaxis of cardiac diseases, especially of the angina pectoris and different forms of cardiac arrhythmias.

The compounds according to the invention can therefore be used either alone, or mixed with one another or mixed with pharmaceutically unobjectionable diluents or supports as pharmaceutical preparations. The pharmaceutical preparations can occur in the form, for example, of tablets, capsules, aqueous or oily solutions or suspensions, emulsions, injectable aqueous or oily solutions or suspensions, dispersable powders or aerosol mixtures. The pharmaceutical preparations can, besides the compounds of the general formula I according to the invention, also contain one or more other pharmaceutically effective substances, for example tranquillisers, such as Luminal, Meprobamate and Chlorpomazine; vasodilators, such as for example glycerine trinitrate and carbochromen; diuretics, such as for example chlorothiazide; heart-toning agents such as for example digitalis preparations; hypotensives, such as for example rauwolfia alkaloids; broncho-dilators and sympathomimetic agents such as for example isoprenaline and ephedrine.

A tablet containing one of the compounds of the present invention may be, for example, of the following composition:

|  | Mg. |
|---|---|
| 1 - ($\beta$ - pyridyl)-3-[3-(o-ethoxy-phenoxy)-2-hydroxypropylamino]-propanol-optically active and laevorotatory | 5 |
| Aerosil | 5 |
| Cornstarch DAB 7 | 20 |
| Lactose DAB 7 | 30 |
| Avicel M.F. XIII | 24 |
| Collidone 25 | 4 |
| Magnesium stearate USP XVIII | 2 |

According to the seriousness of the case to be treated, e.g., 1 to 2 of the tablets may be dispensed to a patient three times a day.

The substances of the present invention were tested with regard to their blocking action on the $\beta$-receptors as follows:

Method

Experiments were carried out in mongrel dogs of either sex. Anaesthesia was maintained by a mixture of chloralose and urethane injected intravenously. In addition, morphine sulfate was given subcutaneously. A cuffed tube was introduced into the trachea and the animals were artificially ventilated with air using a BIRD Mark 7 respirator. Under fluoroscopic control a catheter was introduced into the left ventricular cavity. Left ventricular pressure was measured with Statham transducers of appropriate frequency response. The first derivation of the left ventricular pressure ($=Dp/dt$ in terms of mm. Hg/sec.) was derived electronically from the pressure signal. All measurements were continuously recorded with a BRUSH Mark 260 recorder.

Experimental procedures

Three doses of isoproterenol (0.1–0.2–0.5 gamma/kg.) were injected intravenously. Thereafter increasing doses of the test compound were given intravenously, each dose followed always by the injection of isoproterenol about 10 minutes after application. The Beta-blocking action of the test compound was considered to be maximal if the stimulating effect of 0.5 gamma/kg. isoproterenol intravenously on $Dp/dt$ max. was neary completely inhibited. The different doses used were added up and this dose was taken to compare the effectiveness of the different compounds on resting $Dp/dt$ max.

The following tablet gives the results of the pharmacological tests described above.

| Compound | Dose added up, mg./kg., i.v. | Changes induced by the compound $Dp/dt$ max., percent |
|---|---|---|
| 1-[$\beta$-pyridyl]-3-[3-(o-allyloxy-phenoxy)-2-hydroxypropylamino]-propanol-1 | 0.4 | ±0 |
| 1-[$\beta$-pyridyl]-3-[3-(o-ethoxyphenoxy)-2-hydroxy-propylamino]-propanol-1 | 0.4 | ±0 |
| 1-[$\beta$-pyridyl]-3-[3-(m-methylphenoxy)-2-hydroxy-propylamino]-propanol-1 | 0.9 | −11 |
| 1-[$\beta$-pyridyl]-3-[3-(p-methoxyphenoxy)-2-hydroxy-propylamino]-propanol-1 | 0.9 | +79 |
| 1-[$\beta$-pyridyl]-3-[3-(o-phenylphenoxy)-2-hydroxy-propylamino]-propanol-1 | 0.9 | −22 |
| 1-[$\beta$-pyridyl]-3-[3-(p-tert.-butylphenoxy)-2-hydroxy-propylamino]-propanol-1 | 0.85 | −22 |
| 1-[$\beta$-pyridyl]-3-[3-(o-chlorophenoxy)-2-hydroxy-propylamino]-propanol-1 | 0.9 | +220 |
| 1-[$\beta$-pyridyl]-3-[3-(m-methoxyphenoxy)-2-hydroxy-propylamino]-propanol-1 | 0.9 | +30 |
| 1-[$\beta$-pyridyl]-3-[3-(o-allylphenoxy)-2-hydroxy-propylamino]-propanol-1 | 0.9 | −20 |
| 1-[$\beta$-pyridyl]-3-[3-(p-butoxyphenoxy)-2-hydroxy-propylamino]-propanol-1 | 0.9 | +22 |
| 1-[$\beta$-pyridyl]-3-[3-(o-ethoxyphenoxy)-2-hydroxy-propylamino)-propanol-1 (laevorotatory) | 0.19 | −8 |
| 1-[$\beta$-pyridyl]-3-[3-(o-cyclopentylphenoxy)-2-hydroxy-propylamino]-propanol-1 | 0.6 | −19 |
| Propanolol (comparative compound) | 0.9 | −41 |

The compounds on test were employed in the form of their hydrochlorides.

The production of the compounds according to the invention is explained in greater detail on the basis of the following examples. The compounds according to the invention are frequently non-distillable oils, so that in some cases no melting point is given. In all cases, however, the structure stated is confirmed by the molecular analysis and/or the infrared or nuclear resonance spectrum.

Example 1.—4.2 g. of 1-amino-3-(o-allyloxyphenoxy)-propan-2-ol hydrochloride

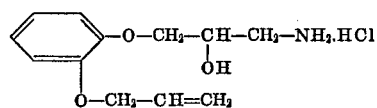

are suspended in 33 mls. of alcohol and then 2.8 g. of the sodium salt of nicotinoyl vinyl alcohol

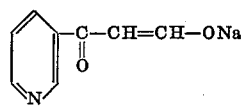

are added and the mixture stirred at room temperature for 20 hours. The suspension is filtered at the pump and the residue washed with alcohol. The filtrate together with the washing alcohol is concentrated in vacuo. There remains an oil which becomes solid after a short time. The residue is processed several times with water and then recrystallised from alcohol. In this way one obtains 1-nocotinoylvinylamino-3-(o-allyloxyphenoxy)-propan-2-ol.

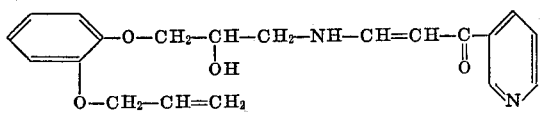

M.p.: 98° C.
Analysis ($C_{20}H_{22}N_2O_4$):
 calculated: C, 67.8; H, 6.2; N, 7.9.
 found: C, 67.7; H, 6.4; N, 8.1.
Yield: 4.6 g.=81% of theory.

The requisite sodium salt of nicotinoyl vinyl alcohol can be produced as follows:

47 g. of sodium methylate are suspended in 340 mls. of absolute benzene, and then whilst stirring at 10° C. a mixture of 74 g. of ethyl formate and 100 g. of 3-acetylpyridine is added slowly drop by drop and the mixture is then left for 24 hours at room temperature. It is then filtered at the pump, washed twice with absolute benzene, then twice with absolute alcohol and finally twice with ether. In this way one obtains the sodium salt of nicotinoyl vinyl alcohol with a yield of 90% of theory.

If instead of the 3-acetylpyridine one takes 2-acetylpyridine or 4-acetylpyridine, during the reaction with ethyl formate and sodium methylate one obtains in an entirely analogous manner the sodium salts of the vinylogous pyridine-2- or -4-carboxylic acid.

The requisite 1-amino-3-(o-allyloxyphenoxy)-propan-2-ol can be produced as follows:

60 g. of 1-(o-allyloxyphenoxy)-2,3-epoxy-propane

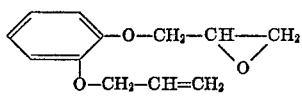

(produced from o-allyloxyphenol and epichlorhydrin in the presence of potash in acetone) are dissolved in 600 mls. of methanol, 300 mls. of liquid ammonia are added and it is stirred for 3 hours in the autoclave at 70° C. It is then concentrated, the residue is dissolved in benzene, extracted twice with dilute hydrochloric acid, the aqueous acid phase is separated, rendered alkaline, extracted three times with benzene and combined benzene phases are concentrated. The solid residue is re-crystallised once from benzene. In this way one obtains 1-amino-3-(o-allyloxyphenoxy)-propan-2-ol:

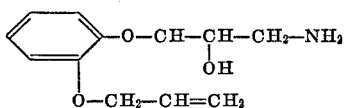

in a yield of 67% of theory. M.p.: 89° C.

The base can be converted in the usual manner with an ether solution of hydrochloric acid into 1-amino-3-(o-allyloxyphenoxy) - propan - 2 - ol hydrochloride with a melting point of 110° C.

Example 2.—4.6 g. of 1-nicotinoyl vinylamino-3-(o-allyloxyphenoxy)-propan-2-ol

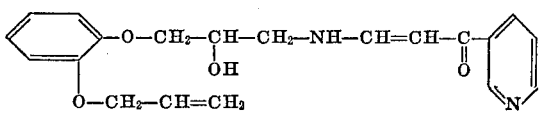

are dissolved in 45 mls. of methanol and 12 mls. of water, 2.5 g. of sodium boron hydride are added and the mixture is stirred at room temperature for 5 hours. Then it is stirred for 8 hours at 70° C. whilst adding a further 8 g. of sodium boron hydride in portions, then the mixture is concentrated in vacuo and the residue is taken up in 60 mls. of water and 60 mls. of chloroform, the chloroform phase is separated, the aqueous solution is extracted a further twice with chloroform, the chloroform solution is dried with sodium sulphate and concentrated in vacuo.

The residual oil is dissolved in dilute hydrochloric acid, the solution is extracted three times with benzene and then the acid aqueous phase is rendered alkaline with soda, and finally extracted three times with chloroform. The chloroform solution is washed with water, dried and concentrated in vacuo.

In this way one obtains 1-(3'-β-pyridyl-3'-hydroxypropylamino) - 3 - (o - allyloxyphenoxy) - propan - 2 - ol as a thick yellow oil.

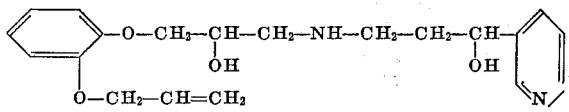

Analysis: ($C_{20}H_{26}N_2O_4$):
 calculated: C, 67.0; H, 7.3; N, 7.8; O, 17.9.
 found: C, 67.2; H, 7.1; N, 7.6; O, 17.8.
Yield: 3.9 g.=82% of theory.

Example 3.—6.8 g. of 1-nicotinoyl vinylamino-3-(o-ethoxyphenoxy)-propan-2-ol

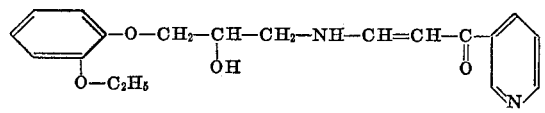

are dissolved in 40 mls. of methanol and 10 mls. of water, 3.9 g. of sodium boron hydride are added and the mixture is stirred at room temperature for 10 hours. Then it is stirred for 6 hours at 70° C. with the addition of a further 5 g. of sodium boron hydride in portions, then the mixture is concentrated in vacuo and the residue taken up in 50 mls. of chloroform and 50 mls. of water, the chloroform phase is separated, the aqueous phase is extracted a further twice with chloroform, then the combined chloroform extracts are dried and concentrated in vacuo. The residual oil is converted into the oxalate and the salt is re-crystallised from alcohol/ether.

In this way one obtains 1-(3'-β-pyridyl-3'-hydroxypropylamino)-3-(o-ethoxyphenoxy)-propan-2-ol dioxalate.
M.p.: 133° C. decomposed
Analysis: ($C_{23}H_{30}N_2O_{12}$):
 calculated: C, 52.5; H, 5.7; N, 5.3.
 found: C, 52.6; H, 5.9; N, 5.5.
Yield: 9 g.=86% of theory.

Example 4

3.4 g. of 1-nicotinoyl ethylamino-3-(o-ethoxyphenoxy)-propan-2-ol, prepared from 3-acetylpyridine, 1-amino-3-(o-ethoxyphenoxy)-propan-2-ol and formaldehyde according to Mannich are dissolved in 15 mls. of methanol and 15 mls. of water and then; whilst stirring at room temperature, in all 2 g. of sodium boron hydride are mixed with it in portions over a period of 3 hours, and then the mixture is left to stand at room temperature for 24 hours. The solution is concentrated, taken up in chloroform/water and the chloroform solution processed. In this way one obtains 1-(3'-β-pyridyl-3'-hydroxypropylamino)-3-(o-ethoxyphenoxy)-propan-2-ol:

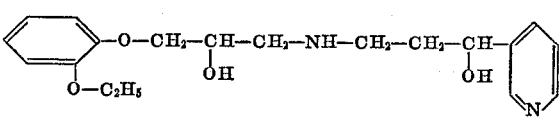

in a yield of 78% of theory.

Example 5.—4.4 g. of 1-amino-3-(p.-tert.-butylphenoxy)-propan-2-ol:

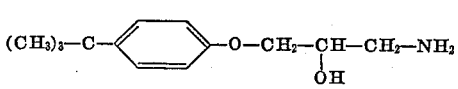

are dissolved in 80 mls. of ethyl acetate and 5.6 g. of anhydrous potash are added. To this mixture one slowly adds whilst cooling and stirring a mixture of 4.1 g. of nicotinoylvinylchloride hydrochloride:

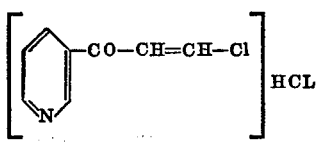

(prepared from the sodium salt of nicotinoyl vinyl alcohol, which first of all is converted with HCl gas into the hydrochloride of the free nicotinoyl vinyl alcohol and then with thionyl chloride into the vinylogous nicotinic acid chloride hydrochloride) in 50 mls. of ethyl acetate and is then stirred for a further 24 hours at room temperature. Then it is filtered at the pump, the residue taken up in water, rendered alkaline with sodium bicarbonate and the solution extracted again with ethyl acetate. The ethyl acetate extracts are concentrated in vacuo together with the original ethyl acetate filtrate. After re-crystallising several times from toluene one obtains in this way 1-nicotinoyl-vinylamino-3-(p - tert.butylphenoxy)-propan-2-ol.

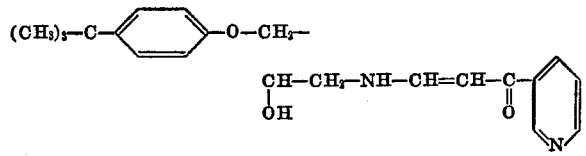

M.p. 97° C.
Analysis: ($C_{21}H_{26}N_2O_3$):
  calculated: C, 71.2; H, 7.3; N, 7.9.
  found: C, 72.1; H, 7.3; N, 7.7.
Yield: 5.8 g.=82% of theory.

As described in Example 2 1-nicotinoyl-vinylamino-3-(p-tert.butylphenoxy)-propan-2-ol can be reduced with sodium boron hydride to 1-(3'-β-pyridyl-3'-hydroxy-propylamino)-3-(p-tert.butylphenoxy)-propan-2-ol

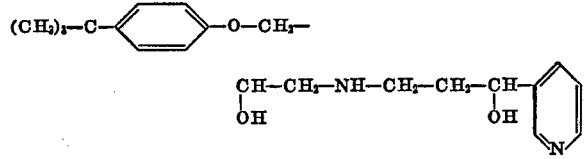

(M.p. of the dioxalate 176° C.).

Example 6.—11.4 g. of the sodium salt of vinologous pyridin-4-carboxylic acid

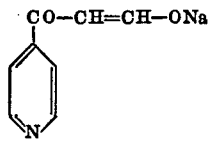

are agitated for 24 hours at room temperature with 16.5 g. of 1-amino-3-(o-ethoxyphenoxy)-propan-2-ol hydrochloride

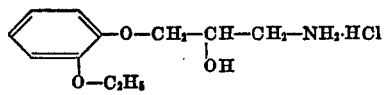

in 120 mls. of ethanol. It is filtered at the pump, the residue is washed with ethanol and then the ethanol filtrates are concentrated in vacuo. An oil is left which becomes solid after several hours. The product is washed several times with water and then re-crystallised from methanol/water. In this way one obtains 1-(isonicotinoyl-vinylamino-3-(o-ethoxyphenoxy)-propan-2-ol:

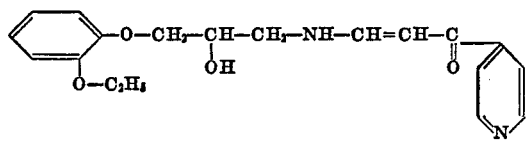

M.p. 69° C.
Analysis: ($C_{19}H_{22}N_2O_4$):
  calculated: C, 66.6; H, 6.4; N, 6.4; N, 8.2.
  found: C, 66.3; H, 6.6; N, 7.9.
Yield: 15 g.=66% of theory.

Example 7

14.5 g. of 1-(isonicotinoylvinylamino) - 3 - (o-ethoxy-phenoxy)propan-2-ol are dissolved in 130 mls. of methanol, and then 32 mls. of water are added and 8.1 g. of sodium boron hydride are mixed with the solution in portions. Then it is agitated at room temperature of 6 hours and then a further 8.1 g. of sodium boron hydride are added and the mixture is heated at 70° C. for 6 hours. It is then concentrated in vacuo, the residue is dissolved in 40 mls. of chloroform and 40 mls. of water, the chloroform phase is separated and the aqueous phase is extracted once again with chloroform. The combined chloroform extracts are dried and concentrated in vacuo. The residual oil is dissolved in dilute hydrochloric acid, the solution is washed twice with benzene, the aqueous solution is adjusted to alkalinity with sodium bicarbonate, extracted with chloroform and the chloroform solution is concentrated in vacuo. The residual oil is dissolved in ethyl acetate and converted into the oxalate with an alcoholic oxalic acid solution. The salt which is greasy at the beginning becomes solid when heated with ethyl alcohol. After the conversion of the oxalate into the free base one obtains in this way 1-(3'-γ-pyridyl-3'-hydroxy-propylamino)-3-(o-ethoxyphenoxy)-propan-2-ol:

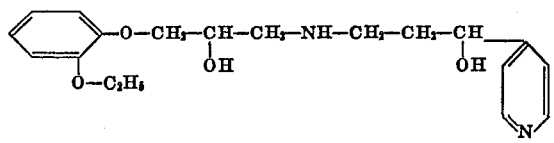

as a crystalline product.

M.p.: 92° C.
Analysis: ($C_{19}H_{26}N_2O_4$):
  calculated: C, 65.9; H, 7.5; N, 8.1.
  found: C, 65.6; H, 7.5; N, 8.1.
Yield: 9.9 g.=67% of theory.

The same product is obtained if one reacts 1-amino-3-(o-ethoxyphenoxy)-propan-2-ol:

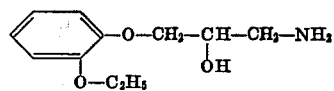

with 1-(γ-pyridyl)-3-chloropropan-1-ol

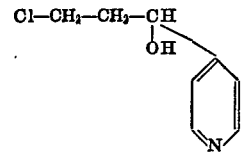

(prepared by reducing isonicotinoylvinyl chloride) in absolute acetone and anhydrous potash.

Example 8.—4.4 g. of 1-(2'-methoxy-4'-allylphenoxy)-2,3-epoxypropane

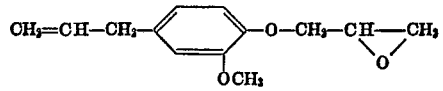

(prepared by heating eugenol with epichlorohydrin and potash in anhydrous benzene: B.P. $_{0.8\ mm.}$: 138–145° C.) are heated for 8 hours under a reflux with 6 g. of 1-(β-pyridyl)-3-aminopropan-1-ol:

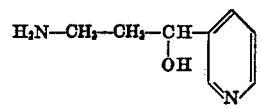

in 60 mls. of alcohol. It is then concentrated in vacuo.

in 60 mls. of alcohol. It is then concentrated in vacuo, the residue is dissolved in dilute hydrochloric acid, the solution is washed several times with benzene, adjusted to an alkaline pH with soda, and the alkaline solution is extracted with chloroform. The chloroform extracts are concentrated in vacuo, the residue is dissolved in a small quantity of absolute dioxane, an insoluble portion is filtered off and the filtrate is mixed with an ether solution of oxalic acid. A precipitate is formed which is first of all greasy but which becomes solid when heated with absolute ethyl alcohol. The product is recrystallised several times from absolute ethyl alcohol. On this way one obtains 1-(3'-β-pyridyl - 3' - hydroxypropylamino)-3-(2'-methoxy-4'-allylphenoxy)-propan-2-ol dioxalate.

M.P.: 132° (decomp.)

Analysis: ($C_{25}H_{32}N_2O_{12}$):
 calculated: C, 54.3; H, 5.8; N, 5.1.
 found: C, 54.1; H, 6.0; N, 4.8.

Yield: 4.8 g.=43% of theory.

The 1-(β-pyridyl)-3-aminopropan-1-ol required as the initial product can be prepared as follows:

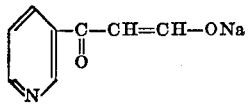

the sodium salt of nicotinoyl vinyl alcohol, is reacted with benzylamine hydrochloride analogously to the instruction contained in Example 1, the resultant N-(nicotinoylvinyl)-benzylamine:

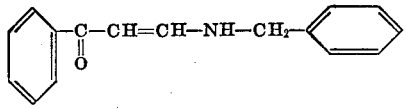

is reduced with sodium boron hydride in an analogous manner to the instructions contained in Example 2 and in this way one obtains a 55% yield of 1-(β-pyridyl)-3-benzylaminopropan-1-ol

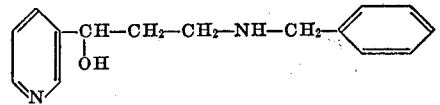

as an oily product, which can be debenzylated in the usual manner with hydrogen in the autoclave to give 1-(β-pyridyl)-aminopropan-1-ol

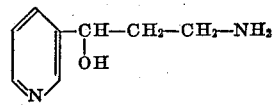

(a viscous oil). In an analogous manner one can also produce other compounds of the general formula Vb.

According to Examples 1 to 8, the compounds listed in the Table were produced. In the Table 2-Py signifies a 2-pyridyl radical:

Correspondingly, 3-Py signifies a 3-pyridyl radical and 4-Py a 4-pyridyl radical.

In the Table below, compounds of the general formula:

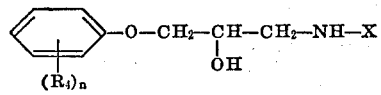

are listed, in which $(R_4)_n$ and X possess the meanings shown in the Table.

TABLE I

| $(R_4)_n$ | X | |
|---|---|---|
| 3-CH₃ | —CH=CH—CO—3-Py | Oil, will not distil. |
| 3-CH₃ | —CH₂—CH₂—CHOH—3-Py | Dioxalate, M.P. 156° C. (decomp.). |
| 2-cyclopentyl | —CH=CH—CO—3-Py | M.P. 110° C. |
| 2-cyclopentyl | —CH₂—CH₂—CHOH—3-Py | Dioxalate, M.P. 166° C. (decomp.). |
| 2-C₆H₅ | —CH=CH—CO—3-Py | M.P. 105° C. |
| 2-C₆H₅ | —CH₂—CH₂—CHOH—3-Py | Dioxalate, M.P. 151° C. (decomp.). |
| 4-CH₃CO—NH— | —CH=CH—CO—3-Py | M.P. 107° C. (decomp.). |
| 4-CH₃CO—NH— | —CH₂—CH₂—CHOH—3-Py | Oil, will not distil. |
| 2,6-Cl₂ | —CH=CH—CO—3-Py | M.P. 127° C. |
| 2,6-Cl₂ | —CH₂—CH₂—CHOH—3-Py | Dioxalate, M.P. 160° C. (decomp.). |
| 2-OC₂H₅ | —CH=CH—CO—3-Py | M.P. 92° C. |
| 4-OCH₃ | —CH=CH—CO—3-Py | M.P. 108° C. |
| 4-OCH₃ | —CH₂—CH₂—CHOH—3-Py | Dioxalate, M.P. 139° C. |
| 2-OCH₃, 4-CH₂—CH=CH₂ | —CH=CH—CO—3-Py | M.P. 94° C. |
| 2-OC₂H₅ | —CH=CH—CO—2-Py | M.P. 88° C. |
| 2-OC₂H₅ | —CH₂—CH₂—CH—2-Py<br>    \|<br>    OH | Oil. |
| 2-(CH₃)₃C | —CH=CH—CO—4-Py | Oil. |
| 2-(CH₃)₃C | —CH₂—CH₂—CH—4-Py<br>    \|<br>    OH | Dioxalate, M.P. 142° C. |
| 2-O—CH₂—C≡CH | —CH=CH—CO—2-Py | Oil. |
| 2-O—CH₂—C≡CH | —CH₂—CH₂—CH—2-Py<br>    \|<br>    OH | Oil. |
| 2-cyclohexyl | —CH=CH—CO—4-Py | M.P. 103° C. |
| 2-cyclohexyl | —CH₂—CH₂—CH—4-Py<br>    \|<br>    OH | Dioxalate, M.P. 161° C. |
| 3-N(CH₃)₂ | —CH=CH—CO—4-Py | Oil. |
| 3-N(CH₃)₂ | —CH₂—CH₂—CH—4-Py<br>    \|<br>    OH | Oil. |
| 2-Cl | —CH=CH—CO—3-Py | M.P. 126° C. |
| 2-Cl | —CH₂—CH₂—CH—3-Py<br>    \|<br>    OH | M.P. 96° C. |

TABLE I—Continued

| (R₁)ₙ | X | |
|---|---|---|
| 4-N(CH₃)(CO-C₆H₅) | —CH=CH—CO—2-Py | M.P. 127° C. |
| 4-N(CH₃)(CO-C₆H₅) | —CH₂—CH₂—CH(OH)—2-Py | Dioxalate, M.P. 183° C. |
| 3,4,5-(OCH₃)₃ | —CH=CH—CO—3-Py | Oil. |
| 3,4,5-(OCH₃)₃ | —CH₂—CH₂—CH(OH)—3-Py | Dioxalate, M.P. 158° C. |
| 2,4-Br₂ | —CH=CH—CO—2-Py | Oil. |
| 2,4-Br₂ | —CH₂—CH₂—CH(OH)—2-Py | Dioxalate, M.P. 143° C. |
| 2,4,5-(CH₃)₃ | —CH=CH—CO—4-Py | M.P. 138° C. |
| 2,4,5-(CH₃)₃ | —CH₂—CH₂—CH(OH)—4-Py | Dioxalate, M.P. 157° C. |
| 4-Cl, 2-CH₃—CO—NH— | —CH=CH—CO—4-Py | M.P. 97° C. |
| 4-Cl, 2-CH₃—CO—NH— | —CH₂—CH₂—CH(OH)—4-Py | Dioxalate, M.P. 149° C. |
| 2,3-(OCH₃)₂ | —CH=CH—CO—3-Py | Oil. |
| 2,3-(OCH₃)₂ | —CH₂—CH₂—CH(OH)—3-Py | Dioxalate, M.P. 127° C. |
| 2,6-(OCH₃)₂ | —CH=CH—CO—3-Py | Oil. |
| 2,6-(OCH₃)₂ | —CH₂—CH₂—CH(OH)—3-Py | Dioxalate, M.P. 172° C. |
| 2-CH=CH₂ | —CH=CH—CO—2-Py | Oil. |
| 2-CH=CH₂ | —CH₂—CH₂—CH(OH)—2-Py | Dioxalate, M.P. 118° C. |
| 2-CH₂—CH=CH—CH₃ | —CH=CH—CO—4-Py | M.P. 112° C. |
| 2-CH₂—CH=CH—CH₃ | —CH₂—CH₂—CH(OH)—4-Py | Dioxalate, M.P. 162° C. |
| 4-C₆H₅ | —CH=CH—CO—4-Py | M.P. 112° C. |
| 4-C₆H₅ | —CH₂—CH₂—CH(OH)—4-Py | Dioxalate, M.P. 158° C. |
| 3-OCH₃ | —CH=CH—CO—3-Py | Oil. |
| 3-OCH₃ | —CH=CH—CO—3-Py | Dioxalate, M.P. 139° C. |
| 4-OC₄H₉ | —CH=CH—CO—3-Py | M.P. 100° C. |
| 4-OC₄H₉ | —CH₂—CH₂—CH(OH)—3-Py | M.P. 87° C. |
| 2-CH₂—CH=CH₂ | —CH=CH—CO—3-Py | M.P. 91° C. |
| 2-CH₂—CH=CH₂ | —CH₂—CH₂—CH(OH)—3-Py | Dioxalate, M.P. 137° C. |
| 4-Br, 2-Cl | —CH=CH—CO—2-Py | M.P. 119° C. |
| 4-Br, 2-Cl | —CH₂—CH₂—CH(OH)—2-Py | Dioxalate, M.P. 161° C. |
| 4-Cl, 5-CH₃, 2-iC₃H₇ | —CH=CH—CO—2-Py | M.P. 123° C. |
| 4-Cl, 5-CH₃, 2-iC₃H₇ | —CH₂—CH₂—CH(OH)—2-Py | Dioxalate, M.P. 179° C. |
| 4-C₂H₅ | —CH=CH—CO—3-Py | M.P. 82° C. |
| 4-C₂H₅ | —CH₂—CH₂—CH(OH)—3-Py | Dioxalate, M.P. 154° C. |
| 2-cyclopentenyl | —CH=CH—CO—4-Py | Oil. |
| 2-cyclopentenyl | —CH₂—CH₂—CH(OH)—4-Py | Oil. |
| 2-Br | —CH=CH—CO—4-Py | Oil. |

TABLE I—Continued

| (R₄)ₙ | X | |
|---|---|---|
| 2-Br | —CH₂—CH₂—CH(OH)—4-Py | Dioxalate, M.P. 141° C. |
| 2-O—CH(CH₃)—CH=CH₂ | —CH=CH—CO—2-Py | Oil. |
| 2-O—CH(CH₃)—CH=CH₂ | —CH₂—CH₂—CH(OH)—2-Py | Oil. |

What we claim is:

1. Derivative of 1-phenoxy - 3 - aminopropane - 2 - ol having the formula

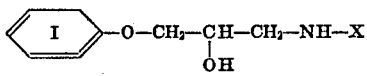

and pharmaceutically acceptable acid addition salts thereof, wherein X is selected from the group consisting of

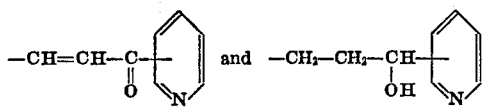

and wherein the phenyl ring I may have up to three similar or different substituents selected from alkyl having 1–4 carbon atoms, alkenyl and alkinyl having in either case up to 6 carbon atoms, cycloalkyl and cycloalkenyl having in either case a ring size of 5–8 carbon atoms, alkoxy, alkenyloxy and alkinyloxy having in either case up to 5 carbon atoms, phenyl, chlorine, bromine and the radical —NR₁R₂ wherein R₁ is selected from alkyl having 1–4 carbon atoms and alkanoyl having up to 11 carbon atoms and benzoyl, naphthoyl and phenyl acetyl and R₂ is selected from hydrogen and alkyl having up to 4 carbon atoms.

2. Derivative of 1-phenoxy - 3 - aminopropane - 2 - ol having the formula

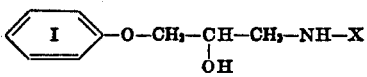

and pharmaceutically acceptable acid addition salts thereof, wherein X is selected from the group consisting of

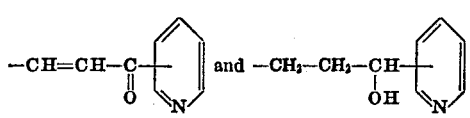

and wherein the phenyl ring I may have up to three similar or different substituents selected from the group consisting of alkyl having 1–4 carbon atoms, alkenyl and alkinyl having in either case up to 6 carbon atoms, cycloalkyl having a ring size of 5–8 carbon atoms, alkoxy, alkenyloxy and alkinyloxy having up to 5 carbon atoms in each case, phenyl, chlorine and bromine and the radical —NR₁R₂, in which R₁ is selected from the group consisting of alkyl having 1–4 carbon atoms and alkanoyl having up to 11 carbon atoms and benzoyl, naphthoyl and phenyl acetic, and R₂ is a substituent selected from the group consisting of hydrogen and alkyl having up to 4 carbon atoms.

3. Derivative of 1-phenoxy-3 - aminopropane - 2 - ol, according to Claim 1, wherein the phenyl ring I is substituted by a substituent selected from the group consisting of vinyl, allyl, methallyl and crotyl.

4. Derivative of 1-phenoxy - 3 - aminopropane - 2 - ol, according to Claim 1, wherein the phenyl ring I is substituted by cyclopentenyl.

5. Derivative of 1-phenoxy - 3 - aminopropane - 2 - ol according to Claim 1, wherein the phenyl ring I is substituted by a substituent selected from the group consisting of cyclopentyl and cyclohexyl.

6. Derivative of 1-phenoxy - 3 - aminopropane - 2 - ol, according to Claim 1, wherein the phenyl ring I is substituted by a substituent selected from the group consisting of methoxy, ethoxy, propoxy, butoxy, allyloxy, methallyloxy, and propargyloxy.

7. Derivative of 1-phenoxy-3 - aminopropane - 2 - ol according to Claim 1, wherein the phenyl ring I is substituted with the radical —NR₁R₂ in which R₁ is a substituent selected from the group consisting of methyl, ethyl, acetyl and benzoyl, and R₂ is a stubstituent selected from the group consisting of methyl and ethyl.

8. Derivative of 1-phenoxy - 3 - aminopropane - 2 - ol, according to Claim 2, wherein the phenyl ring is substituted by a substituent selected from the group consisting of vinyl, allyl, methallyl and crotyl.

9. Derivative of 1-phenoxy - 3 - aminopropane - 2 - ol, according to Claim 2, wherein the phenoyl ring I is substituted by a substituent selected from the group consisting of cyclopentyl and cyclohexyl.

10. Derivative of 1-phenoxy - 3 - aminopropane - 2 - ol, according to Claim 2, wherein the phenyl ring I is substituted with a substituent selected from the group consisting of methoxy, ethoxy, propoxy, butoxy, allyloxy, methallyloxy and propargyloxy.

11. Derivative of 1-phenoxy-3-aminopropane - 2 - ol, according to Claim 2, wherein the phenyl ring I is substituted by the radical —NR₁R₂ wherein R₁ is a substitent selected from the group consisting of methyl, ethyl, acetyl and benzoyl, and R₂ is a substituent selected from the group consisting of hydrogen, methyl and ethyl.

References Cited

UNITED STATES PATENTS

| 3,328,417 | 6/1967 | McLoughlin et al. | 260—307 |
| 3,412,154 | 11/1968 | Fleming et al. | 260—570.5 |
| 3,679,693 | 7/1972 | Ross et al. | 260—296 AE |

G. THOMAS TODD, Primary Examiner

U.S. Cl. X.R.

260—295 R; 295 AM; 295.5 R, 295.5 A, 296 AE, 307 F; 424—263